United States Patent
Jindal et al.

(10) Patent No.: US 7,941,312 B2
(45) Date of Patent: May 10, 2011

(54) DYNAMIC MIXED-INITIATIVE DIALOG GENERATION IN SPEECH RECOGNITION

(75) Inventors: Sandeep Jindal, Chandigarh (IN); Pankaj Kankar, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 374 days.

(21) Appl. No.: 12/061,748

(22) Filed: Apr. 3, 2008

(65) Prior Publication Data

US 2009/0055165 A1 Feb. 26, 2009

Related U.S. Application Data

(63) Continuation of application No. 11/841,147, filed on Aug. 20, 2007, now abandoned.

(51) Int. Cl.
*G06F 17/27* (2006.01)

(52) U.S. Cl. .............................. 704/9; 704/255; 704/257

(58) Field of Classification Search .................. 704/3, 4, 704/7, 9, 10, 257, 251, 255, 270, 270.1, 1
See application file for complete search history.

(56) References Cited

U.S. PATENT DOCUMENTS

| | | | |
|---|---|---|---|
| 7,228,278 B2 * | 6/2007 | Nguyen et al. | ................. 704/257 |
| 2003/0225825 A1 | 12/2003 | Healey et al. | |
| 2004/0085162 A1 | 5/2004 | Agarwal et al. | |
| 2004/0117804 A1 | 6/2004 | Scahill et al. | |
| 2004/0217986 A1 | 11/2004 | Hambleton et al. | |
| 2005/0203747 A1 | 9/2005 | Lecoeuche | |

* cited by examiner

*Primary Examiner* — Huyen X. Vo
(74) *Attorney, Agent, or Firm* — Wolf, Greenfield & Sacks, P.C.

(57) ABSTRACT

Disclosed are a method (500), apparatus (100) and computer program product for generating a mixed-initiative dialog to obtain information for dialog slots. A composite grammar dependent upon a set of unfilled slots is constructed (501). A prompt, dependent upon the a set of unfilled slots, is presented (309) to a user. An utterance is received (301) from the user in response to said prompt. Relevant information is determined based upon the further utterance. One or more said unfilled slots are filled (302) with said relevant information.

21 Claims, 5 Drawing Sheets

DYNAMIC MIXED-INITIATIVE DIALOG GENERATION IN SPEECH RECOGNITION

CROSS-REFERENCE TO RELATED APPLICATIONS

This application is a continuation of U.S. application Ser. No. 11/841,147 filed Aug. 20, 2007, the complete disclosure of which, in its entirety, is herein incorporated by reference.

FIELD OF THE INVENTION

The present invention relates generally to speech recognition systems, and in particular, to dialog-based speech recognition systems.

BACKGROUND

Speech-enabled applications, enabling users to interact with machines using speech as a control mode, are becoming more prevalent with advances in technology.

Natural-language speech enabled systems attempts to closely emulate human-human interaction and ideally allow users to speak in a natural manner. Such systems ask open ended questions like "How May I Help You?" to the user and allow the user to respond in the user's own desired manner, a manner over which the system has no control. In order to accommodate this user flexibility, a natural-language-based speech recognizer must have a relatively large vocabulary, and a relatively large grammar, which tend to result in poor recognition accuracy. Moreover, in order to understand the free-form response, which is typical of such systems, natural-language-based systems also require a high level of natural language understanding.

On the other hand, dialog-based speech enabled systems ask very specific questions of the user and each question requires a specific response that is restricted to a set of pre-defined inputs as decided by the system. Dialog-based systems ask the user a specific question (also referred to as a "prompt"), and based upon the user's response, the dialog-based system progresses in a particular (pre-defined) order to thereby acquire sufficient information from the user to perform the desired action. Dialog-based systems exploit the limited context which results from the dialog-based approach, in order to improve recognition accuracy. Consequently, in the dialog-based system, a speech recognizer only needs to handle small grammars when processing the response elicited by each prompt in the generated dialog. This approach also reduces the size of the vocabulary required by the recognizer. The recognition accuracy of dialog-based speech recognition systems can accordingly be increased. However dialog-based systems force the user to model his or her response in a system-defined manner. Another disadvantage of dialog-based systems is the fact that the user has to traverse the prompt/response tree in order to obtain the desired information that resides at a specified leaf of such a tree.

In dialog-based systems, the inputs to the system are typically referred to as "slots" (also referred to as "fields" or "information fields" in this description), where a pre-defined set of slots is needed by application in order to perform a corresponding task. Each member slot is associated with a specific type of information. Typical dialog-based arrangements use a "system-initiated" approach, also known as directed-dialog approach, in which the user must respond to prompts from the system precisely in the order defined by the system. In such arrangements, specific grammar is defined along with a suitable prompt to elicit information to fill a particular slot. Multiple slots typically can not be filled based upon a single user utterance. Furthermore, the user utterance can not be used to fill any other slot other than the one for which information has been solicited. This approach results in rigid system-directed interaction which makes the interaction long and monotonous for the user, often resulting in user dissatisfaction.

To overcome these problems and make dialog-based system more flexible, mixed-initiative dialog systems have been developed. In mixed-initiative systems the user need not make a response which is strictly compliant with the prompt. The user response can also be used to fill a slot other than the slot that is directly associated with the current prompt. Furthermore, more than one slot can be filled on the basis of a single user utterance. This approach places some control with the user who consequently has some flexibility of approach in filling the slots, and both the computer and the user play a role in directing the dialog.

Mixed initiative systems require composite grammars (also referred to as Mixed-Initiative or MI grammars in this description) which allow slots to be filled arbitrarily. Existing mixed-initiative systems are however inflexible, complex and not easily portable across applications.

The Voice Extensible Markup Language (VXML) specification of the World Wide Web Consortium (W3C) provides constructs for writing MI dialogs. The VXML "form-level grammar" allows more than one field to be filled using a single user utterance. It is also possible to fill up information fields other than those being asked about by the system. The VXML construct "initial" together with form-level grammar and the VXML "Form Interpretation Algorithm" (FIA) are used in MI applications using VXML. However, these VXML constructs enable only very primitive mixed-initiative dialog systems. In particular, the prompts presented by such systems typically do not correspond well with the information to be collected from the user. There is no mechanism to enable information collection for only a subset of slots among the initial set of MI slots in a dialog interaction. The support for "confirmation" and "disambiguation" is not robust. The resulting systems are inflexible and can neither be easily configured for different behaviour, nor easily ported for different applications.

Agarwal et al. (R. Agarwal, B. M. Shahshahani, "*Method and Apparatus for Providing A Mixed-Initiative Dialog Between A User and A Machine*", US Patent Application US2004/0085162 A1, May 6, 2004) presents a mixed-initiative dialog system that presents a natural language speech interface to the user. The speech recognizer in Agarwal uses statistical language models. Agarwal uses Natural Language Processing (NLP) to parse a user utterance in order to obtain the information needed to fill various slots. However, as discussed, natural language speech approaches are very prone to recognition error, with consequent lack of accuracy. Furthermore, use of NLP for parsing adds further recognition errors and system complexity.

SUMMARY

It is an object of the present invention to substantially overcome, or at least ameliorate, one or more disadvantages of existing arrangements. Disclosed are arrangements, referred to as Dynamic Mixed-Initiative Dialog Generation in Speech Recognition (or simply as DMIDG arrangements) which seek to address the above problems by (a) automatically generating a composite grammar from the atomic grammar(s) associated with individual slots, (b) making such arrangements applicable to composite tasks, and (c) dynamically enabling multiple slots to be filled based upon a single user response, (d) dynamic generation of prompts from base prompts, (e) dynamic generation of voice-dialog code for each dialog-interaction (also referred to as a dialog cycle). The DMIDG arrangements also make available configuration parameters which facilitates portability across different applications.

Therefore, broadly stated, there are disclosed methods, apparatus and computer program products for generating a mixed-initiative dialog to obtain information for a pre-defined set of dialog slots. A sub set of these slots for collecting information from the user is selected based on user-interaction history and desired dialog flow. A composite grammar dependent upon the selected subset of slots is constructed. A prompt, dependent upon the selected sub set of slots is generated and presented to the user. An ASR recognized user-input is received from the user in response to said prompt. The recognized user-input is parsed and matched against slot grammars to identify if the user-input provides relevant information for the slot. One or more said unfilled slots are filled with said relevant information.

In a further arrangement, the DMIDG approach can be implemented to incorporate dynamic generation of VXML code at the client side, to provide for user interaction, automatic generation of composite grammar for mixed-initiative dialog from individual grammar components, and author defined composition rules. An arrangement using, for example XML to define the MI dialog flow enables provision of different dialog flavours which make such arrangements usable across different applications.

BRIEF DESCRIPTION OF THE DRAWINGS

One or more embodiments of the present invention will now be described with reference to the drawings and Appendices. In the drawings.

Figure 1:
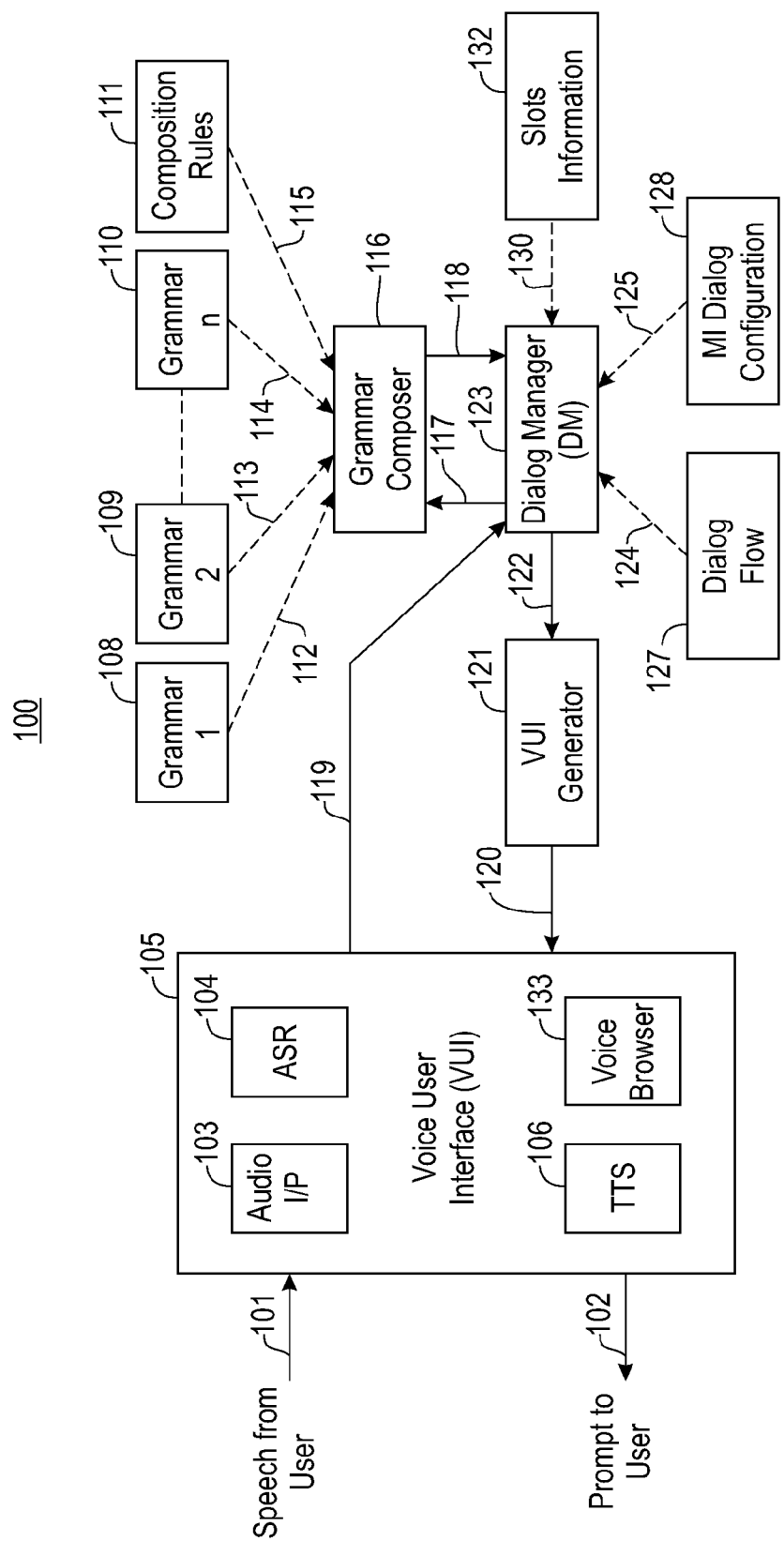
FIG. 1 shows a functional block diagram of an DMIDG system.

Appendix A is an XML representation of the slot information component;

Appendix B is an XML representation of the MI dialog configuration component;

Appendix C depicts an example of the grammar composition rule where the composition rules has been specified using XML;

Appendix D shows an example of dialog flow information; and

Appendix E shows another example of dialog flow information.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

The disclosed DMIDG arrangements provide a mechanism for generating a grammar based Mixed Initiative (MI) dialog that allows dynamic selection of a subset of slots for information collection. The arrangements can be configured for different dialog flow strategies, for use across different applications. The DMIDG arrangements provide support for disambiguation, confirmation and use of reusable dialog components.

An important element in the disclosed DMIDG arrangements is Dynamic composition of composite grammar from atomic grammars (or rules for atomic grammar) using grammar composition rules. A grammar specifies permissible user utterances and valid values for a piece of information to be collected from the user. The atomic grammar(s) specify grammar for single atomic pieces of information. If the information to be collected from the user consists of multiple atomic pieces of information, a composite grammar is required.

The mechanism for composing the composite grammar involves specifying rules that define how atomic grammar(s) (or the rules for atomic grammars) can be combined to dynamically form the composite grammar for a given set of information/dialog slots. It is not necessary for grammar composition to specify rules for each possible permutation of slots. Accordingly, the rules define how atomic grammar (or the rules for atomic grammars) can be combined. The composition Rules may be generic across slots, and apply to a given slot irrespective of its arrangement in the set of input slots. The generic rules refer to the atomic grammars and specify mandatory and optional prefixes and suffixes which apply to the atomic grammar for a given slot for any combination of this slot with other slots. There is also provision to specify the rules that apply to specific permutations of slots. The rules can thus, for example, specify conjunctions to join two atomic grammars, permutation specific prefixes, suffixes and so on.

In one particular arrangement, the mechanism specifies an XML schema and uses XML to define the grammar composition rules.

Another important element in the disclosed DMIDG arrangements is dynamic prompt generation. Thus, for example, an application may need to collect different pieces of information (represented by different slots) from the user. When using dynamic dialogs, the subset of slots that needs to be filled is dynamically determined during user interaction. The prompts that need to be presented are also to be determined dynamically. It is very tedious and cumbersome to provide prompt for each possible permutation of Slots. Accordingly dynamic generation of prompts, for example for "input" as well as events like "help", "confirmation" and so on is provided by defining rules for prompt generation. These rules have a general part that defines the prompt segment(s) which is general to all slots, and a slot specific part that defines prompt segment(s) that would be included in a prompt only if corresponding slot(s) are members of subset of slots that are part of dialog cycle. These rules can also specify inclusion of a slot value in a prompt segment.

In one particular arrangement, the mechanism specifies an XML schema and uses XML for dynamic prompt generation.

Another important element in the disclosed DMIDG arrangements is dynamic selection of slots for information collection in a particular dialog turn (also referred to as a dialog cycle). For a given set of slots, the subset of slots for which information needs to be collected may vary during interaction with user and may depend on dialog history, user-input, desired dialog flow among others. For example, slots that have already been filled may need to be disabled for information collection.

The DMIDG arrangements thus provide a mechanism for dynamically enabling a subset of slots for information collection. Information collection for other slots is disabled. According to this arrangement, voice dialog code is generated after every user-interaction cycle. User-input is processed on receiving user response based on the subset of slots for which information is solicited from the user. The slot information is updated and voice dialog code is generated for next cycle. Furthermore, a dialog flow or set of rules can be specified for generation of voice dialog. The dialog flow rules may also specify task of disambiguating collected information or confirming the information besides the task of collecting information for the slots. The voice dialog code generated, as specified above, depends both on the user-input in previous interaction(s) and on the dialog flow rules.

In one particular arrangement, the mechanism specifies an XML schema to define the dialog flow.

Grammar Terminology

Atomic grammars specify basic grammars for an atomic piece of information.

Slot grammar specifies the grammar that is applicable for the given slot. It usually consists of an atomic grammar that forms the base of the slot grammar and a set of suitable prefixes and suffixes added to it.

Base grammar is the atomic grammar that forms the base (core) of the slot grammar Example Consider the example of a round trip flight that asks for departure date and arrival date which are two information slots. There is a date grammar that specifies basic rules/utterances for specifying a date in general. Valid utterances include $19^{th}$ Mar. 1973, Mar. 19, 1973, Apr. 5, 1980, $5^{th}$ of Feb. 2007 etc. The date grammar specifies date irrespective of context.

Departure date and arrival date are also dates but they also have some specific connotations/context added to them. If a user says $10^{th}$ Mar. 2007, it is not known if the user meant departure or arrival date. The user may specify additional prefixes/suffixes to be added to vanilla date grammar to form grammar for the respective slot information.

The grammar for departure date may specify "departing on" as a prefix to date and arrival date may specify "arriving on" or "reaching on" as prefixes to date grammar. The slot grammar for departure date would be as follows:
a) "departing on"<date> (all possible utterance of date, < > means all possible values of element to be combines with specified qualifier)
Slot grammar for arrival date would be
b) "arriving on"<date> OR
   "reaching on"<date>
   Thus
Date is an Atomic Grammar
a) is slot grammar for departure date and b) is slot grammar for arrival date.
The date atomic grammar forms the base of the slot grammars a) and b) and is also known as base grammar in context of slot grammars.

While specifying rules for creating composite grammar for a subset of given set of slots, many rules are generic to a slot. Generic rules for a slot in this context mean the rules that apply to a slot irrespective of its permutation with other slots (ie the rules can apply to slots irrespective of their membership in a particular permutation of slots). For example flight reservation composite information asks for class, departure city and arrival city besides dates. For departure city, "from" as prefix to <city> is a generic rule for departure city slot. It could be used for all combinations of departure city with other info slots.

Possible permutations along with the example utterance include:
"Economy class" "from London" "to Delhi" "departing on $12^{th}$ February"
"from London" "on Economy class" "to Delhi"
Flight "departing on $12^{th}$ February" "from London" "to Delhi"
"to Delhi" "from London" "on Economy class"

From as prefix is thus a generic rule for departure city slot, similarly To as prefix is generic rule for arrival city slot as they applies to these slots irrespective of where they are positioned in composite utterance.

In summary, the disclosed DMIDG arrangements for dynamic generation of MI dialog makes use of above mechanisms.

Functional Block Diagram

FIG. 1 shows a functional block diagram of a DMIDG system 100. A Voice User Interface (VUI) 105 interfaces with the user (not shown). The VUI 105 presents, as depicted by an arrow 102, prompts to the user, to which the user responds with voice utterances (also referred to as a voice input) 101. The VUI 105 receives these utterances 101 from the user. The VUI 105 includes an audio input interface 103, and an Automatic Speech Recognition module (ASR) 104. The VUI 105 also includes a text-to-speech module (TTS) 106, and a voice browser 133 that interprets the voice-dialog code and executes it.

A voice browser (133) is a web browser that presents an interactive voice user interface to the user. Just as a visual web browser works with HTML pages, a voice browser operates on pages that specify voice dialogues. The voice dialogues are implemented using voice dialogue languages like VoiceXML (VXML), the W3C's standard voice dialog markup language, SALT, and other proprietary languages.

Voice browser makes use of other elements of VUI (TTS, ASR and Audio I/p) to execute voice dialog. It uses TTS to render textual information as audio and present this information aurally to the user. The voice browser receives user input in form of text from ASR. 103 is an audio input device, usually a microphone that transforms user's acoustic input to equivalent electrical signal. ASR (104) receives this transformed electrical speech signal and converts it to text using speech recognition algorithms that in turn makes use of appropriate acoustic models and language models/grammar.

The VUI 105 provides, as depicted by an arrow 119, utterance information to a Dialog Manager (DM) 123. The DM 123 manages the flow of the complete dialog with the user. The DM 123 receives the utterance information 119 from the VUI 105, and directs, as depicted by an arrow 122, inputs to a VUI generator 121. The VUI generator 121 can be implemented, for example, using programming languages such as C or Java.

In response to these inputs 122, the VUI generator 121 generates appropriate voice-dialog code 120 that implements a voice dialog. The voice dialog code 120 can take various forms, depending upon the implementation, and can be in VXML, or in another language such as SALT, X+V suitable for implementing a voice dialog. The voice dialog code is communicated, as depicted by an arrow 120, to the VUI 105. The voice browser 133 in the VUI 105 executes the voice-dialog code 120 and drives the other VUI components (eg the ASR 104 and the TTS 106). The voice browser 133 passes the text prompt 120 to the TTS 106 which makes use of this text prompt 120 to output the prompts delivered to the user as depicted by the arrow 102.

Figure 2:
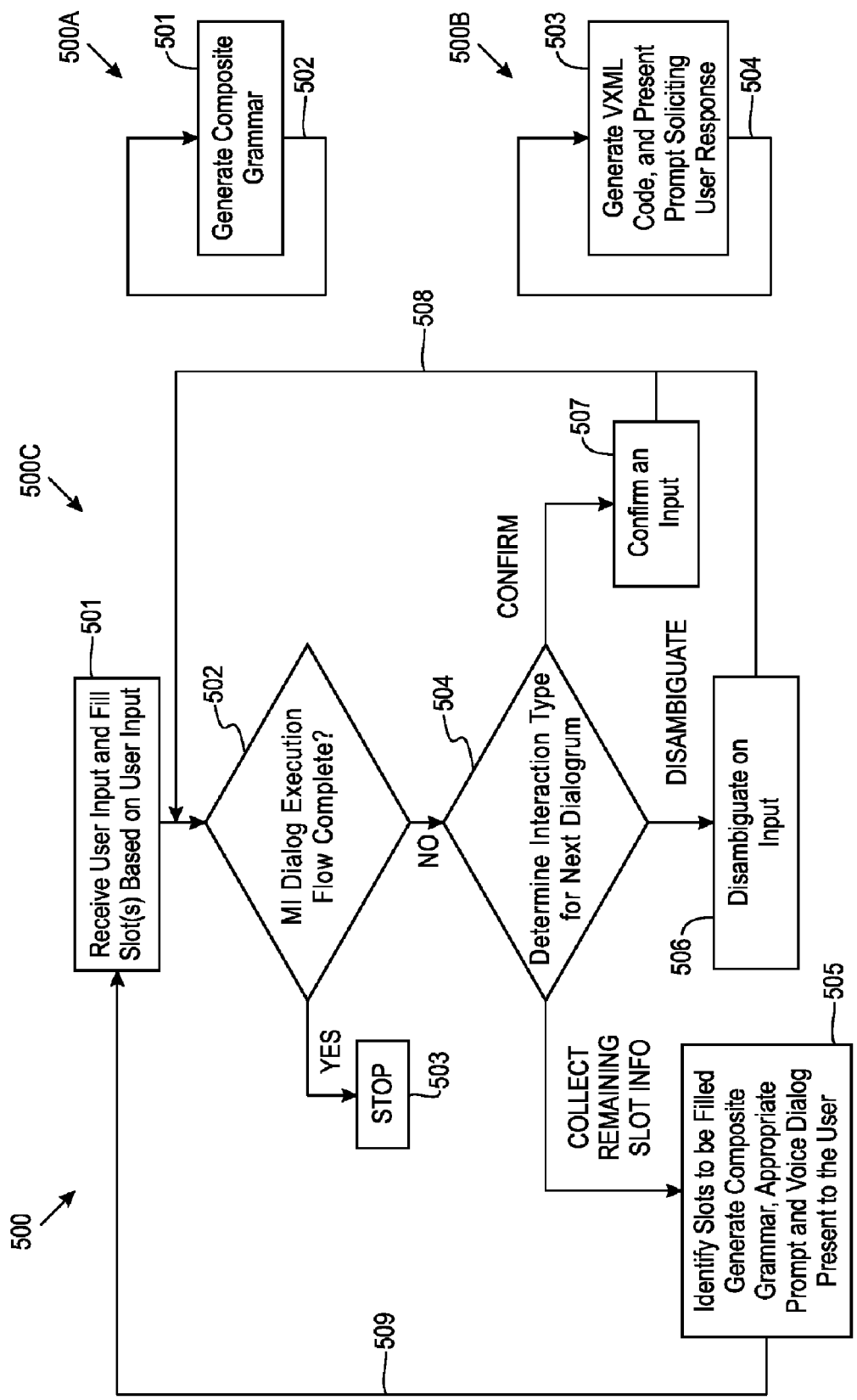
FIG. 2 is a flow chart showing an example of how the system of FIG. 1 operates.

The DM 123 decides which type of interaction is to occur (i.e., input, confirmation, and disambiguation as described in relation to FIG. 2), which slots are to be filled, which prompts are to be provided to the user, and which pre-defined (atomic) grammars need to be active in order to obtain required input from the user to fill the slots of the dialog in question. The DM 123 provides, as depicted by an arrow 117, appropriate inputs to a grammar composer 116 in order to obtain the required composite grammar. The DM 123 receives, as depicted by an arrow 118, corresponding information (i.e., an appropriate composite grammar) from the grammar composer 116. For every MI dialog, the DM 123 maintains an ongoing history of which user responses (i.e., utterances in response to prompts) have been received.

The Grammar Composer 116 is responsible for grammar composition. The grammar composer 116 uses, as depicted by dashed arrows 112-115, sets of pre-defined atomic grammars 108-110 and pre-defined composition rules 111 as inputs. The composition rules 111 refer to the atomic grammars 108-110 and specify mandatory and optional prefixes and suffixes which apply to any combination of the atomic grammars 108-110. The composition rules may be generic and need not be defined for each possible permutation of atomic grammars. The composition rules can also define rules for specific permutations of slots. Thus, for example, the composition rules can specify conjunctions to join two atomic grammars, permutation specific prefixes and suffixes and so on. Based on a dialog state signalled by the DM 123, as depicted by the arrow 117, the grammar composer 116 generates an appropriate mixed-initiative composite grammar and communicates this, as depicted by the arrow 118, to the DM 123. The composite grammar specifies permissible user utterances and valid information to be collected from the user. The atomic grammars 108-110 specify grammars for single atomic pieces of information.

With regard to the prompt(s), help and other events which are required for a dialog, the DM 123 makes use, as depicted by dashed arrows 130 and 125 respectively, of a pre-defined Slot Information component 132, and of a pre-defined MI dialog configuration component 128. The slot information component 132 defines all the slots that are part of the MI dialog and may optionally specify prompt information for input, help, and repeat events associated with each slot. An example of the slot information component 132 is presented in Appendix A. The MI dialog configuration component 128 specifies prompt information for an MI dialog. The MI dialog configuration component 128 thus enables the DM 123 to generate dynamic prompts corresponding to a subset of slots for which information is being solicited. An example of the MI dialog configuration component 128 is presented in Appendix B.

Figure 5:
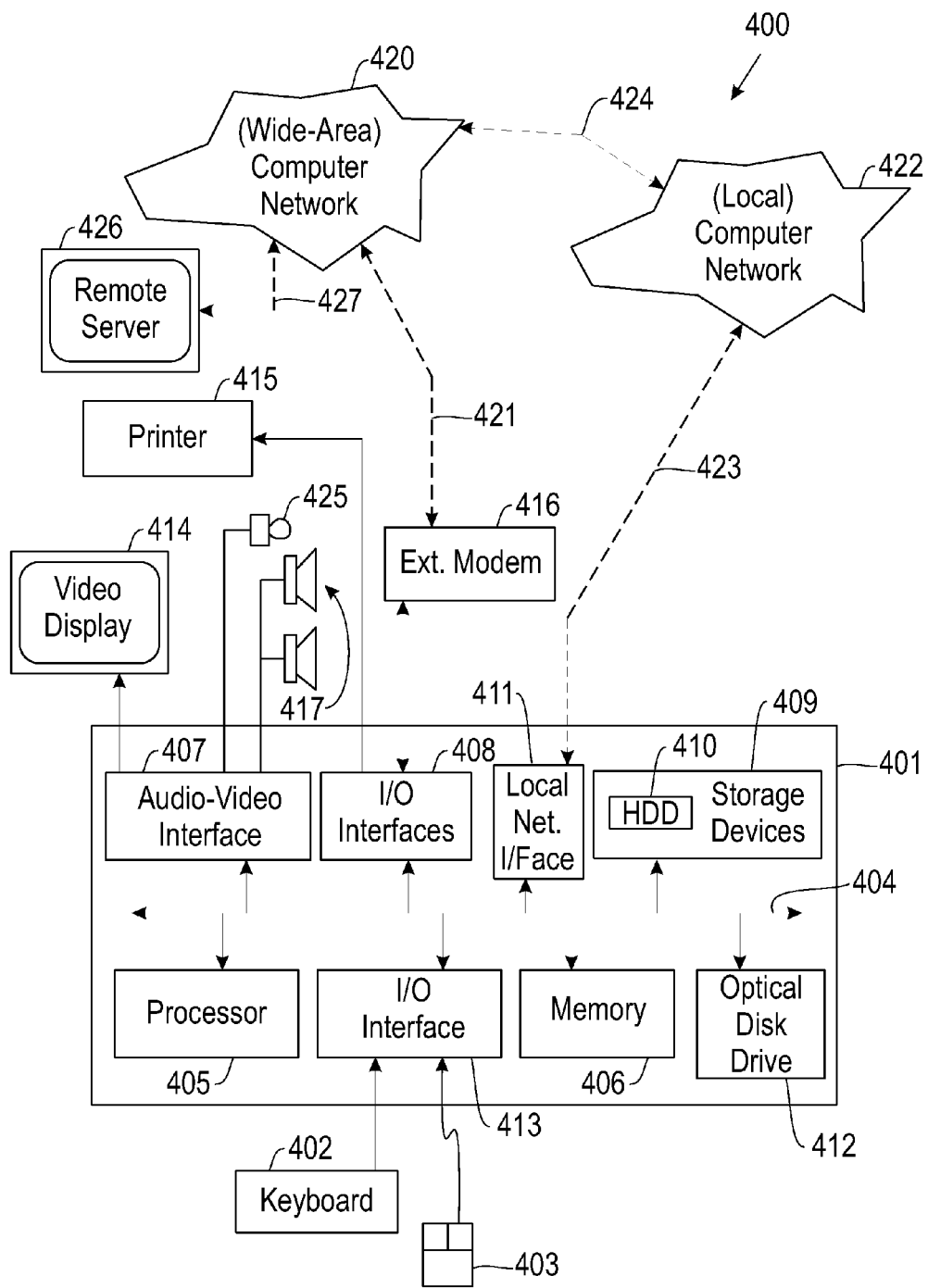
FIG. 5 is a schematic block diagram of a general purpose computer upon which DMIDG arrangements can be practiced.

The various system elements can be stored in a centralised or distributed manner, according to system requirements and/or convenience, in a remote server 426, a storage device 409, or similar devices (not shown) as depicted in FIG. 5.

Overall Process Flow

FIG. 2 is a flow chart showing an example process 500 of how the system of FIG. 1 operates. The process 500 comprises three concurrent sub-processes 500A, 500B, 500C.

In the disclosed DMIDG arrangements, the subset of slots that needs to be filled in a particular dialog cycle is dynamically determined during user interaction. The prompts that need to be presented are also determined dynamically. In the sub-process 500A, and particularly a step 501, the grammar composer 116 (see FIG. 1) generates (i.e., constructs) the composite grammar based on the atomic grammars 108-110, the composition rules 111, and the dialog state. Appendix C depicts an example of the grammar composition rules 111 where the composition rules have been specified using XML. Other formats such as tokenized text, graph etc. equally can be used to specify the composition rules. This sub-process 500A loops continuously as depicted by an arrow 502, as described in more detail in regard to FIG. 3.

Concurrently, in a step 503 of the sub-process 500B, the DM 123 determines the structure of the dialog to be presented to the user, generates suitable prompts, and invokes the VUI generator 121 to generate the Voice dialog code 120 with appropriate prompts, and presents it to user. This sub-process 500B loops continuously, as depicted by an arrow 504, as described in more detail in regard to FIG. 4. The described example uses VXML to implement Voice dialog, however other languages and data structures SALT, X+V can equally be used.

In a step 501 of the third concurrent sub-process 500C, the DM 123 receives the utterance 101 from the user that the user utters in response to the input prompt 102 that is generated by the step 503, and fills slots based upon the user utterance. The step 501 fills one or more slots dependent upon the aforementioned received utterance from the user. Thereafter, in a step 502, the DM 123 determines, based upon the dialog flow component 127 and the slots information component 132, whether the execution flow of the current MI dialog is complete or not. If the dialog is complete, then the process 500C follows a "YES" arrow from the step 502 to a "STOP" step 503. If the dialog is not complete, then the process 500C follows a "NO" arrow from the step 502 to a step 504. In the step 504, the DM 123 determines, based upon the current dialog state and the dialog flow information 127 whether to (a) collect remaining information, or to (b) disambiguate the input, or to (c) confirm the input. The step 502 relates to one Prompt/Response pair for prompts that solicits input information for slots.

If the step 504 determines that remaining information is to be collected, then the sub-process 500C follows a COLLECT arrow from the step 504 to a step 505, in which the DM 123 collects remaining information. Here, the DM 123 identifies the slots to be filled, asks the grammar composer 116 to generate composite grammar corresponding to the unfilled slots, and composes the dialog for a current dialog cycle, including appropriate prompts, corresponding to the unfilled slots using the slot information 132 and the MI dialog information 128. Thereafter, the sub-process 500C is directed back to the step 501.

Returning to the step 504, if it is determined that the input is to be disambiguated, then the process 500C is directed from the step 504 via a DISAMBIGUATE arrow to a step 506 in which the DM 123 disambiguates the input. As a part of disambiguation process, the DM 123 generates a disambiguation dialog using an appropriate disambiguation prompt and corresponding grammar, and presents it to the user. Thereafter, The DM 123, based upon a user utterance received as a result of the disambiguation prompt, disambiguates the original input. Thereafter, the sub-process 500C is directed from the step 506 back to the step 502.

Returning to the step 504, if the DM 123 determines that the input is to be confirmed, then the sub-process 500C is directed from the step 504 via a CONFIRM arrow to a step 507 in which the DM 123 confirms the input. As a part of the confirmation process, the DM 123 generates the appropriate prompt playing back the values of different slots that were filled as a result of the previous user utterance and asks the user for confirmation of those values. The DM 123 receives a user response 101 in confirmation. In the case of a negative confirmation, the DM 123 interacts with the user by generating an appropriate error correction dialog 120 to rectify errors, until all the values in the original input are confirmed. The sub-process 500C is then directed back to the step 502.

Automatic Grammar Generation

Figure 3:
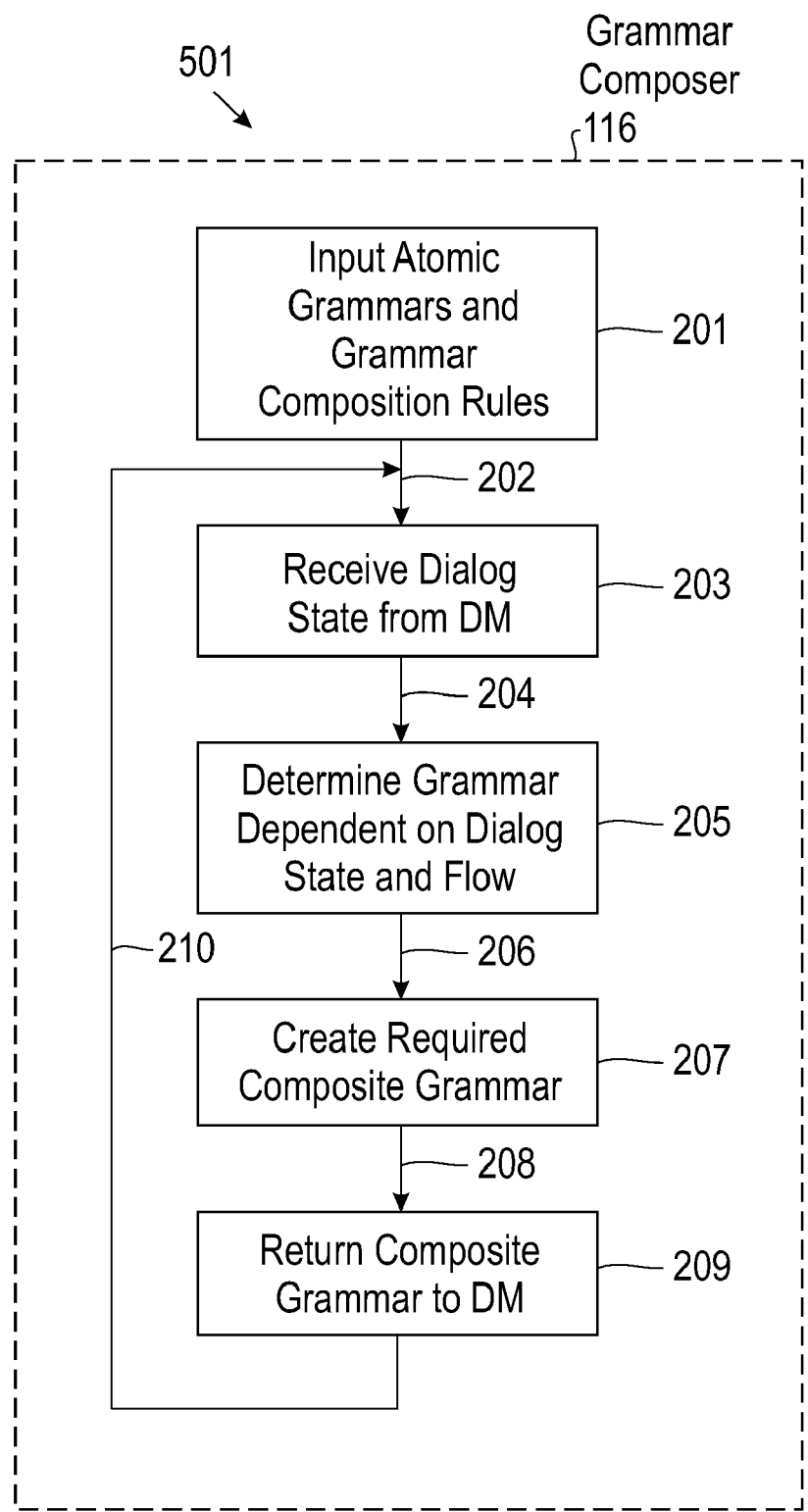
FIG. 3 is a flow chart showing operation of the grammar composer process.

FIG. 3 is a flow chart showing operation of the grammar composer sub-process 500A in FIG. 2. The "generate composite grammar step" 501 in FIG. 2, which is performed, as depicted by a dashed rectangle, by the grammar composer 116 of FIG. 1, commences with a step 201 in which the grammar composer 116 inputs the atomic grammars 108-110 and the grammar composition rules component 111. In an alternate arrangement, the grammar composer 116 can access the aforementioned components 108-111 on a per prompt/response pair basis.

In a following step 203 the grammar composer 116 receives, from the DM 123, the state of the present dialog. The state describes the type of user interaction (input, disambiguation, confirmation) and the slots that would be the part of the next user interaction. Using this information of participating slots and interaction type, the grammar composer 116, in the following step 205, determines the atomic grammars that should be used for composing the composite grammar, for the next user interaction.

In the following step 207, the grammar composer 116 creates the required composite MI grammar using the required atomic grammars 108-110 and the set of grammar composition rules 111. The composition rules 111 specify grammar information for each slot that defines the slot grammar (the grammar applicable for the slot). The information includes the atomic grammar that forms the base of the slot grammar. The information of the atomic grammar is mentioned, for example, in the baseGrammar attribute of grammar tag in the set of grammar composition rules in APPENDIX C. The grammar composition rules set also contain grammar composition rules that define the rules to combine slot grammars to form a composite grammar for a sub set of slots. As noted, an example of grammar composition rules set with composition rules is shown in Appendix C. This embodiment of grammar composition rules set uses XML schema for specifying composition rules but system is not limited to the usage of XML and any other format such as tag based text, tokenized text, directed graph etc. can be used.

After composing the grammar, in a following step 209, the grammar composer 116 returns the composite grammar to the DM 123. It is noted that the step 207 constructs the composite grammar dependent upon the dialog state received in the step 203. The dialog state depends upon previous utterance(s) by the user, as well as on the dialog flow information component 127. The process 501 is then directed, according to an arrow 210, from the step 209 back to the step 203.

Dialog Process Management

Figure 4:
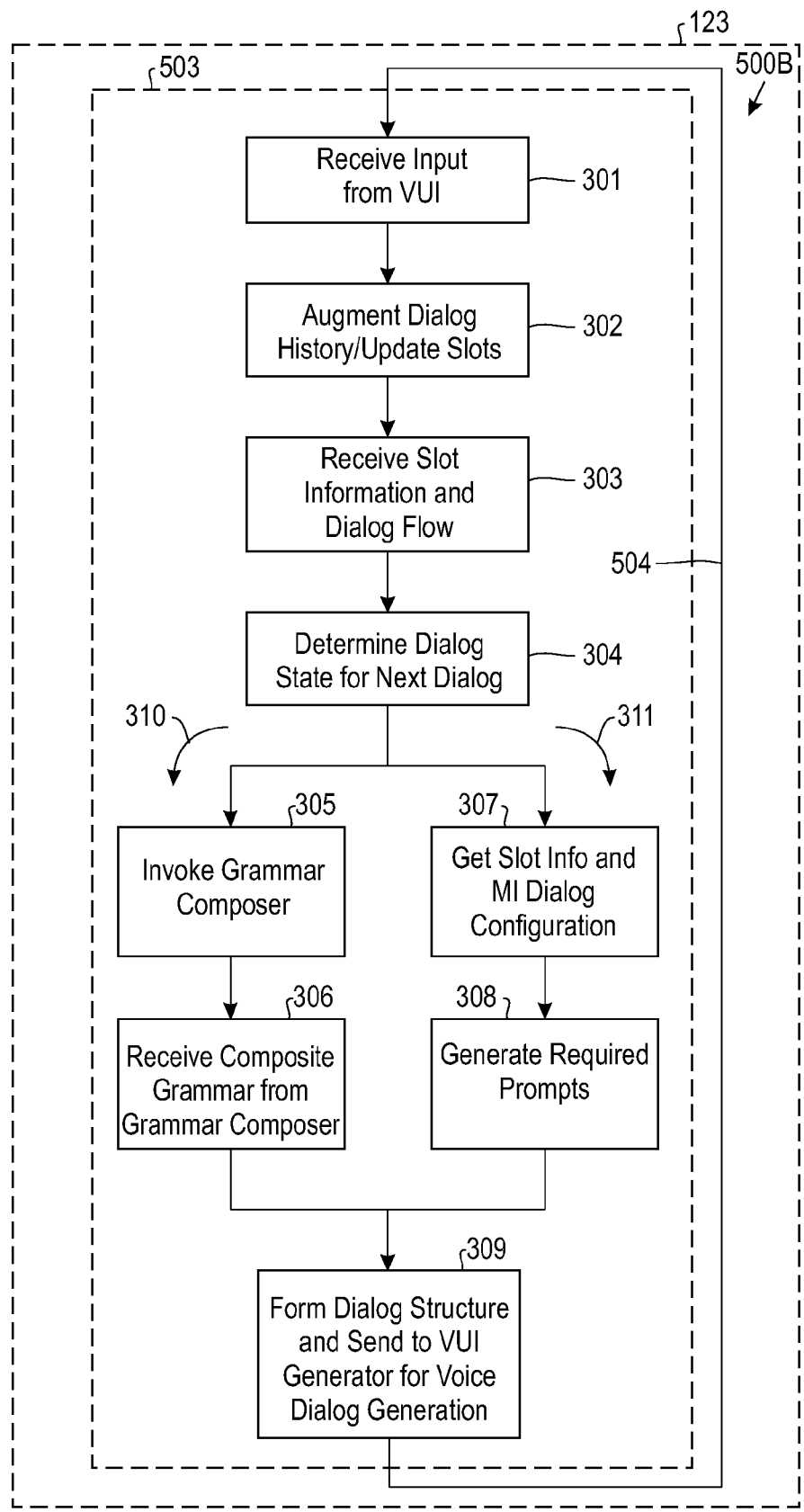
FIG. 4 is a flow chart showing operation of the Dialog Manager process.

FIG. 4 is a flow chart showing operation of the second sub-process 500B, and specifically the DM process 503 in FIG. 2. The process 503, which is performed by the DM 123 is depicted by a dashed rectangle in FIG. 4. The process 503 commences with a step 301 in which the DM 123 receives, as depicted by an arrow 119, an input reflecting a received user utterance from the VUI 105 in FIG. 1.

Thereafter, in a step 302, the DM 123 augments the dialog history which it maintains for every dialog. The dialog history records the interaction states of various slots, including whether a slot has been filled or not, and if a slot has not been filled, then its state (ie no input received, OR the slot value need disambiguation, OR the slot value need confirmation etc).

Thereafter, in a step 303, the DM 123 receives information 130 and 124 from the slot information components 132 and the dialog flow component 127 respectively. The dialog flow information 124 from the dialog flow component 127 is used to determine the type of next user interaction (ie input, disambiguation, or confirmation). An example of dialog flow information is given in Appendix D: "Collect First Strategy", and another example of dialog flow information is show in Appendix E: "Confirm First Strategy". The dialog flow information 124 along with the dialog history determines the slots that would be part of the next user interaction and the structure of the next dialog.

In a following step 304, the DM 123 determines a dialog state (based on the dialog history) and information on the slots to be filled.

The process 503 then bifurcates into two concurrent strands referred to using reference numerals 310 and 311.

In the strand 310, in a first step 305 the DM 123 sends the dialog state (based on the dialog history) and information on the slots to be filled to the grammar composer 116 (see the step 203 in FIG. 3) thereby invoking the grammar composer 116. Thereafter, in a step 306, the DM 123 receives a composite grammar from the grammar composer 116 (see the step 209 in FIG. 3).

In the strand 311, in a first step 307 the DM 123 refers to the slot information component 132 and the MI dialog configuration information component 128 and obtains the prompt and other events related information for the participating slots. The DM 123 uses this information, to generate prompt, help and other events information required for the dialog in a following step 308.

Once both the strands 310 and 311 are completed, the process 503 is directed to a following step 309 in which the DM 123 sends the aforementioned information, generated in the strands 310 and 311, to the VUI generator component 121. The process 503 is then directed, in accordance with an arrow 504, back to the step 301.

Computer Hardware Platform

FIG. 5 is a schematic block diagram of a general purpose computer upon which DMIDG arrangements can be practiced. The DMIDG method may be implemented using a computer system 400, such as that shown in FIG. 5 wherein the processes of FIGS. 2, 3 and 4 may be implemented as software, such as one or more DMIDG application programs executable within the computer system 400. In particular, the DMIDG method steps are performed by instructions in the software that are carried out within the computer system 400. The instructions may be formed as one or more code modules, each for performing one or more particular tasks. The software may also be divided into two separate parts, in which a first part and the corresponding code modules performs the DMIDG methods and a second part and the corresponding code modules manage a user interface between the first part and the user.

The software may be stored in a computer readable medium, including the storage devices described below, for example. The software is loaded into the computer system 400 from the computer readable medium, and then executed by the computer system 400. A computer readable medium having such software or computer program recorded on it is a computer program product. The use of the computer program product in the computer system 400 preferably effects an advantageous DMIDG apparatus.

As seen in FIG. 5, the computer system 400 is formed by a computer module 401, input devices such as a keyboard 402, microphone 425 and a mouse pointer device 403, and output devices including a printer 415, a display device 414 and loudspeakers 417. An external Modulator-Demodulator (Modem) transceiver device 416 may be used by the computer module 401 for communicating with a remote server 426 over a communications network 420 via a connection 421. The network 420 may be a wide-area network (WAN), such as the Internet or a private WAN. Where the connection 421 is a telephone line, the modem 416 may be a traditional "dial-up" modem. Alternatively, where the connection 421 is a high capacity (eg: cable) connection, the modem 416 may be a broadband modem. A wireless modem may also be used for wireless connection to the network 420.

The computer module 401 typically includes at least one processor unit 405, and a memory unit 406 for example formed from semiconductor random access memory (RAM) and read only memory (ROM). The module 401 also includes an number of input/output (I/O) interfaces including an audio-video interface 407 that couples to the video display 414, microphone 425 and loudspeakers 417, an I/O interface 413 for the keyboard 402 and mouse 403 and optionally a joystick (not illustrated), and an interface 408 for the external modem 416 and printer 415. In some implementations, the modem 416 may be incorporated within the computer module 401, for example within the interface 408.

The computer module 401 also has a local network interface 411 which, via a connection 423, permits coupling of the computer system 400 to a local computer network 422, known as a Local Area Network (LAN). As also illustrated, the local network 422 may also couple to the wide network 420 via a connection 424, which would typically include a so-called "firewall" device or similar functionality. The interface 411 may be formed by an Ethernet™ circuit card, a wireless Bluetooth™ or an IEEE 802.21 wireless arrangement.

The interfaces 408 and 413 may afford both serial and parallel connectivity, the former typically being implemented according to the Universal Serial Bus (USB) standards and having corresponding USB connectors (not illustrated). Storage devices 409 are provided and typically include a hard disk drive (HDD) 410. Other devices such as a floppy disk drive and a magnetic tape drive (not illustrated) may also be used. An optical disk drive 412 is typically provided to act as a non-volatile source of data. Portable memory devices, such optical disks (eg: CD-ROM, DVD), USB-RAM, and floppy disks for example may then be used as appropriate sources of data to the system 400.

The components 405, to 413 of the computer module 401 typically communicate via an interconnected bus 404 and in a manner which results in a conventional mode of operation of the computer system 400 known to those in the relevant art. Examples of computers on which the described arrangements can be practised include IBM-PC's and compatibles, Sun Sparcstations, Apple Mac™ or alike computer systems evolved therefrom.

Typically, the DMIDG application programs discussed above are resident on the hard disk drive 410 and read and controlled in execution by the processor 405. Intermediate storage of such programs and any data fetched from the networks 420 and 422 may be accomplished using the semiconductor memory 406, possibly in concert with the hard disk drive 410. In some instances, the DMIDG application programs may be supplied to the user encoded on one or more CD-ROM (not shown) and read via the corresponding drive 412, or alternatively may be read by the user from the remote server 426 over the networks 420 or 422.

Still further, the software can also be loaded into the computer system 400 from other computer readable media. Computer readable media refers to any storage medium that participates in providing instructions and/or data to the computer system 400 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the DMIDG application programs and the corresponding code modules mentioned above may be executed to implement one or more graphical user interfaces (GUIs), such as the Voice User Interface 105 (see FIG. 1), to be rendered or otherwise represented upon the display 414. Through manipulation of the keyboard 402 and the mouse 403, a user of the computer system 400 and the application may manipulate the interface to provide controlling commands and/or input to the applications associated with the GUI(s).

The DMIDG approach may alternatively be implemented in dedicated hardware such as one or more integrated circuits, including, for example, graphic processors, digital signal processors, or one or more microprocessors and associated memories.

Example

The disclosed DMIDG arrangement is now further described, using an example in which a speech application requires a user to provide their credit card information. This information consists of the credit card type, number and expiry date. Credit card expiry slot uses date atomic grammar as its base. The example involves a series of prompts by the system 100 (system prompts being represented as "S" in the following example), and corresponding responses by the user (user responses being represented by "U" in the following example):

S1: Please specify credit card information. Specify the credit card date in dd/mm/yyyy format, credit card number and card type.

U1: Visa

S2: Specify the credit card expiry date in dd/mm/yyyy format and credit card number U2: Help S3: Please specify the date as March 2004, card number as sixteen digits number like 4437 2164 3289 9138.

U3: Credit card number 5145 3478 1689 4762 expiring on June 2009

S4: Did you say credit card with card number 5145 3478 1689 4762, expiry date June 2009 and card type Visa?

U4: Yes

Appendices A-E relates to XML implementations of components used in the above example using an MI dialog according to the disclosed DMIDG approach. In particular, the text segment in Appendix A relates to Slot Information (see 128 in FIG. 1) for the example dialog. The text segment in Appendix B relates to Mixed Initiative Dialog configuration Information (see 127 in FIG. 1) for the example dialog. The text segment in Appendix C relates to the Grammar Composition Rules (see 111 in FIG. 1) for the example dialog. The text segment in Appendix D relates to an example of Mixed Initiative Dialog Flow Strategy named "Collect First Strategy" used by the dialog flow component 127, and the text segment in Appendix E relates to an alternate "Confirm First Strategy" used by the dialog flow component 127.

Appendix A describes the preferred embodiment of the slot information component, referred to as "SlotInformation", (see 128 in FIG. 1) for the example CreditCardInfo dialog. "SlotInformation" defines all the slots/fields that are part of the MI dialog and also provides prompt and other configuration information for the slot. In the preferred embodiment, the example uses an XML structure for specifying the slot information; however other languages and structures may equally be used. Each atomic slot/field that forms an element in the example MI dialog is defined. Each slot is identified by a unique ID (i.e., the identification of the slot), and this ID is used to refer this element everywhere else in the system. Help, prompts, confirm, and other events are defined for each slot and this information is used in case the dialog falls back to the directed dialog mode soliciting input only for that particular slot.

In addition to the information associated with each slot, information for the composite Mixed Initiative Dialog (see 127 in FIG. 1) is presented in Appendix B as a separate construct "MIDialog". This construct defines the prompts, help, confirm and other events that are specific for the MI dialog. The Mixed Initiative dialog configuration 127 is used to create the appropriate input prompts and other event messages for the MI Dialog. Accordingly, prompts are created depending on whether the particular slot has been filled or not. The above-noted example relates to a dialog having three components namely Credit card type, number and expiry date.

Appendix C presents an example of the Grammar Composition Rules Component (see 111 in FIG. 1), this being referred to as "grammarComposition". The input to the component 111 is, in this example, an XML file, however other languages and data structures can be used.

The following text also relates to the above XML embodiment of the example of the MI dialog using the disclosed DMIDG approach. In particular, the following text segment relates to the Dialog Flow Information (see 127 in FIG. 1) for the example dialog. The dialog flow can proceed in one of the at least two following manners:

Collect First

In this dialog flow strategy, first the input is collected for all the fields that constitute the composite MI dialog. Once input for all the fields has been collected, a confirmation is made for input for all the fields in one interaction. If user response to confirmation is negative, the errors are rectified one by one for each field. The flow steps as specified are 1. Collect all fields
2. Confirm
3. Rectify the erroneous components/slots.

Confirm First

In this dialog flow strategy, user input is asked for the set of fields that constitute composite MI dialog. The user response may fill only a subset of fields. Before soliciting user input for remaining fields, a confirmation is made for the fields that have already been filled by the previous user response. If there is an error it is rectified. Only when this subset of fields has been filled correctly, system solicits input information for the remaining fields. The flow is specified as sequence of following steps 1. Collect MI slots
2. Confirm the collected slots.
3. Rectify the erroneous collected slots.
4. Collect remaining sots
5. Repeat steps 2, 3, and 4 till all the slots are filled and confirmed.

As noted above, Appendix D presents an XML specification of the "Collect First Strategy" used by the dialog flow component 127, and Appendix E presents an XML specification of an alternate "Confirm First Strategy" used by the dialog flow component 127.

The above two example strategies demonstrate how the same MI dialog can be configured to provide different flavour of dialog flows and user interaction. The above strategies are merely examples of inputs to the dialog flow component 127, but are not restricted to it. The application developer who is using the MI dialog can define its own dialog flow strategy according to the application requirement using the dialog flow constructs. The example embodiment uses XML and an XML schema to define a dialog flow strategy but other schemas and languages can be used as well.

Conclusion

It will be apparent from the above that the arrangements described are applicable to the computer and data processing industries. The foregoing describes only some embodiments of the present invention, and modifications and/or changes can be made thereto without departing from the scope and spirit of the invention, the embodiments being illustrative and not restrictive.

Thus, for example, the sub-process commencing with the step 505 in FIG. 2 can, in an alternate embodiment, collect user utterances relating to all slots as an initial step, and then confirm and/or rectify information as appropriate, as depicted by the XML code for the "Collect First Strategy" in Appendix D.

The disclosed DMIDG arrangements ease development of mixed-initiative dialog systems, which can consequently be easily configured and ported for different applications. The disclosed approach allows speech application developer to dynamically enable a subset of slots among the original set of MI dialog slots for gathering user information. The subset of slots to be enabled can be chosen based on previous user response, dialog-interaction history, desired dialog flow or any other suitable parameter or a combination of such parameters. This empowers application developers to build very flexible MI dialogs. The disclosed approach provides a grammar-based dialog which typically provides improved accuracy of the speech recognition interface. The disclosed arrangements also provide a mechanism for generation of composite grammar automatically from individual atomic grammars. The automatic grammar composition mechanism of the disclosed MIDAGS approach can also be used in other scenarios (besides the MI dialog scenario) requiring a large number of composite grammars. An example scenario includes speech enabled applications where the grammar for subsequent dialog depends on the choice made at current dialog or input provided at current dialog. For example, frequent flier information application. It asks for frequent flier number and password. Using the frequent flier number, the application identifies the frequent flier category. Depending on the frequent flier category user can access different level of information. A basic category user can access information on seats availability, fare discount and meals whereas Gold user can also get information on Lounges and Priority Checkin. The composite grammar that is applicable to two users is different and composite grammar for Gold customer should have Lounge choices and Priority Checkin grammar elements in addition to grammar elements valid for basic user.

APPENDIX A

The following text segment relates to Slot Information (see 132 in FIG. 1) for the example dialog. The text segment defines all the slots/fields that are part of the mixed initiative dialog and provide relevant information about the slots. The example dialog described in the disclosure consists of three fields, credit card type, number and expiry date. Hence the slot information for the dialog has three slot elements characterizing three fields as depicted below.

```
<SlotInformation>
<!-
Description of slot element.
id=unique identity of the slot or field. This is used in rest of the application to refer
```

-continued to this field including getting the value of the field.
name (optional)= name that describes the slot.
grammarid = reference to the grammar in grammarComposition file. The will
relate a component to a grammar.
externalCompoent (optional) = If some external component is defined e.g. rdc
component. The component should adhere/inherit some generic properties of the
architecture.
comp-config-path (optional)=path of an external file that defines the configuration
of the slot. This is optional.
It contains different prompts/help and confirm events.
-->
<!-
    The first element characterizes the expiry date field of credit card information
dialog. All the attributes for the slot element has been shown here.
    -->
<slot id="date" name="Expiry Date" grammarid="creditCardDate"
externalComponent="rdc.date" comp-config-
path="/relativePath/DateSlotConf.xml">
    <prompt no="1"> Please tell me the expiry date. </prompt>
    <prompt no="2"> Please specify the expiry date. </prompt>
    <help no="1"> You can specify as march 2004, or march two zero zero
four, etc. </help>
    <help no="2"> For example, specify date as april 2005. No need to specify
the day. </help>
<confirm>
    Did you say <component id="date" />?
</confirm>
</slot>
<!--
This element characterizes the credit card type field. The user does not want to
specify any name for the field and hence has not specified name attribute. There is
no external dialog component for the field and hence the external-component
attribute is also not specified. This is valid as these attributes are optional.
-->
<slot id="cardType" grammarId="creditCradType"comp-config-
path="/relativePath/TypeSlotConf.xml">
    <help> You can specify one of the Visa Card or Master Card as credit
card type. </help>
</slot>
<!--
This element characterizes the credit card number field of the dialog. It has only
mandatory attributes and none of the optional attribute has been specified.
-->
<slot id="number" grammarId="cardNumber">
</slot>
</SlotInformation>

APPENDIX B

The following text segment relates to Mixed Initiative Dialog Configuration Information (see 128 in FIG. 1) for the example dialog.

<!-
    Description of MIDialog element.
It encapsulates the information regarding MI dialog as a whole. It defines the
prompts, help messages and confirm messages that will be spoken as a combination
of slots.
The actual prompt or message that is generated depends on the fields that are
intended to be collected from the user in the particular dialog turn. This is achieved
using the "slot id" tag used inside with prompt and messages. The text enclosed by
the "slot id" field will be part of TTS only is the filed identified by the "slot id" is
part of that dialog turn. The value "all" is special value for slot id. It signifies that
the enclosing text would be used with all possible combinations of the input fields.
-->
<MIDialog>
<prompt no="1">
<slot id="all">Please specify the credit card information.</slot>
    Specify the <slot id="date">expiry date in dd/mm/yyyy format </slot>,
<slot id="number"> card number </slot> and <slot id="cardType" > card
type </slot>
</prompt>
<!--
The dynamic prompt generation would be explained with reference to the above
prompt for some example conditions.

-continued

1. In the initial dialog turn all the three fields are intended to be collected, hence all the slot ids would be active and the prompt as specified in S1 in the example dialog would be generated that contains all text segments specified in the above prompt tag.
2. In the first dialog turn user has specified a valid value for the credit card type. Hence the type field has been filled. Therefore in the subsequent dialog turn remaining two fields, expiry date and card number would be collected. Thus the text enclosed by slot id "type" would not be part of the TTS text. The prompt generate for second dialog turn would be as specified by S2 in example dialog.
-->
```
<help no="1">
    Please Specify <help id="date">date as 2nd march 2004 </help> <help id="number"> card number as sixteen digit number like 4437 2164 3289 9138</help> <help id=" cardType"> card type as one of visa, master card.
</help>
</help>
<!--
The processing of "slot id" field in confirm message is little different. The text segment enclosed by the "slot id" tag will be included in the corresponding TTS only if the field referred by the slot has been filled as part of the user utterance. The "value" tag is used to capture the value of the field specified by the slot id which becomes part of the confirmation message and is played back to the user. The confirm message that would be generated when all the slots have been filled is specified by S4 in the example dialog.
-->
<confirm>
    Did you say credit card with <slot id="number"> card number <value id="number" /> </slot>, <slot id="date"> expiry date <value id="date"/> </slot> and<slot id=" cardType"> card type <value id=" cardType"/> </slot>
</confirm>
</MIDialog>
```

APPENDIX C

The following text segment relates to the Grammar Composition Rules (see 111 in FIG. 1) for the example dialog.

```
<!--
Atomic grammars are combined using the specified composition rules to form Composite grammar. In this example of composite grammar for credit card information, the constituent atomic grammars are date, credit card number and credit card type. The description of each grammar used is specified in this file.
-->
<grammarComposition id="creditCardInfo">
    <composition>
        <prefix>The credit card information is </prefix>
        <prefix> Credit card </prefix>
        <suffix> is the card detail </suffix>
    </composition>
<!--
    Description of grammar element 'Credit Card Date'
    id = unique identification of the grammar component.
    Name (optional) = name of grammar
    noPrefixWhenSingle = (true or false) indicates if this is to be used without prefixes.
-->
<grammar id="creditCardDate" baseGrammar="path/date.grxml" noPrefixWhenSingle="true">
    <prefix> expiry date </prefix>
    <prefix> the expiry date is </prefix>
    <prefix> Expiring on </prefix>
</grammar>
<!--
    Description of grammar element 'Credit Card Number'
-->
<grammar id="creditCardNumber" baseGrammar="path/number.grxml" noPrefixWhenSingle="false">
    <prefix>number</prefix>
    <prefix>as number</prefix>
    <prefix>the number</prefix>
    <suffix>is the number</suffix>
</grammar>
<!--
    Similar specifications for other required elements of the composite grammar, eg. 'Credit card type'
-->
<!--
    Description of fixed-rule element
    grammars-invloved= list of grammars for which the fixed rules hold
    name = name of grammar
    noPrefixWhenSingle = (true or false) indicates if this is to be used without prefixes.
-->
<fixed-rules>
    <fixed-rule grammars-involved="creditCardDate cardNumber">
        <rule>
            <grammar-ref name="cardNumber" />
            <conjunction> expiring on </conjunction>
            <grammar-ref name="creditCardDate" />
        </rule>
    </fixed-rule>
    <fixed-rule grammars-invlolved="creditCardDate cardNumber cardType"> <
        <rule> <
            grammar-ref name="cardNumberGrammar" />
            <conjunction optional="true"> of type </conjunction>
            <grammar-ref name="cardTypeGrammar" />
            <conjunction > expiring on </conjunction>
            <grammar-ref     name="creditCardDateGrammar" />
        </rule>
    </fixed-rule>
</fixed-rules>
</grammarComposition>
```

APPENDIX D

The following text segment relates to Dialog Flow (see 127 in FIG. 1) for the example dialog and defines the "Collect First Strategy". The "Collect First Strategy" can be specified using the following XML code:

```
<!-
Specifies a dialog flow strategy, "Collect First Strategy"
MIFlow: The tag that defines a particular dialog flow strategy
id= Unique id of the strategy
desc (optional): description of the strategy
-->
<MIflow id="CollectFirst" desc="Collect user input for all slots before further
processing">
<!--
CollectFields: Defines the user input collection phase for various fields
candidateFields: Defines the set of fields which are candidates for the collection
phase
method="All" means collect all the candidate fields first (before confirmation)
-->
    <CollectFields candidateFields="all" method="All" />
<!-
repeat: repeat the enclosed set of steps until the condition specified by the cond
attribute is met.
cond - Specifies the repeat condition
allConfirmedTrue - Till all the collected elements are confirmed as 'true'
-->
    <repeat cond="allConfirmedTrue">
<!-
Confirm: Confirm from user that the collected input is correct
candidateFields: Specifies the set of input fields for which the confirmation has to
be done
type: defined the method or type of confirmation. It can be confirm each element
(candidate Field) one by one only or confirm all the collected elements in One-go.
RectifyErrors:If confirmation is not true, rectifies the error in input collected
method:defines the method of identifying the error and correcting it.
'oneByone'each input is checked for correctness one by one and in case of error
rectified one by one.
-->
        <Confirm candidateFields="all" type="all" />
        <RectifyErrors method="oneByone" />
    </repeat>
</MIflow>
```

APPENDIX E

The following text segment also relates to Dialog Flow (see 127 in FIG. 1) for the example dialog and defines the "Confirm First Strategy". The "Confirm First Strategy" can be specified using the following XML code:

```
<MIflow name="ConfirmCollected" desc=" First confirm the user input
for the filled slots before collecting information for remaining slots">
    <CollectFields candidateFields="all" method="oneShot" />
    <repeat cond="allConfirmedTrue">
        <repeat cond="CollectedConfirmedTrue">
            <Confirm candidateFields="collected" type="all" />
            <RectifyErrors candidateFields="collected"
method="oneByone" />
        </repeat>
        <CollectFields candidateFields="remaining" method="oneShot"
/>
    </repeat>
</MIflow>
```

We claim:

1. A method of generating a mixed-initiative dialog to obtain information for a set of information slots in a voice dialog system capable of receiving voice inputs from a user via at least one audio input interface and providing voice prompts to the user via at least audio output interface, the method comprising computer implemented steps performed by the voice dialog system, the method comprising:

using at least one computer to performs steps of:
selecting a subset of slots from the set of information slots, dependent upon a set of unfilled slots for which information is to be obtained in a current dialog cycle;
constructing a composite grammar dependent upon the selected subset of slots and also dependent upon pre-defined atomic grammars each associated with at least one of the selected subset of slots and upon pre-defined grammar composition rules, the pre-defined grammar composition rules specifying:
at least one of prefixes and suffixes which apply to a combination of the atomic grammars, wherein a said prefix is one of mandatory and optional and a said suffix is one of mandatory and optional; and
specific permutations of slots and associated atomic grammars, wherein if certain permutations of slots are not valid or not desired, they can be specified as negative rules;
generating a prompt dependent upon the selected subset of slots, wherein the prompt and the composite grammar form at least part of a current dialog cycle;
receiving a user response to the prompt via the at least one audio interface;
comparing the response to the composite grammar;
determining, dependent upon the comparing step, if the response provides relevant information for the set of unfilled slots; and
filling one or more of the set of unfilled slots with said relevant information.

2. A method of generating a mixed-initiative dialog to obtain information for a set of information slots in a voice dialog system capable of receiving voice inputs from a user via at least one audio input interface and providing voice prompts to the user via at least audio output interface, the method comprising computer implemented steps performed by the voice dialog system, the method comprising:

using at least one computer to perform steps comprising:
selecting a subset of slots from the set of information slots, dependent upon a set of unfilled slots for which information is to be obtained in a current dialog cycle;
constructing a composite grammar dependent upon the selected subset of slots, comprising:
selecting from specified grammar composition rules those rules that apply to the selected subset of slots;
forming a slot grammar for each slot in the selected subset of slots using at least one corresponding rule in the selected grammar composition rules; and
combining the slot grammars using the selected grammar composition rules to produce the composite grammar, said composite grammar being applicable to permutations of the selected subset of slots;
generating a prompt dependent upon the selected subset of slots;
receiving a user response to the prompt via the at least one audio interface;
comparing the response to the composite grammar; and
determining, dependent upon the comparing step, if the response provides relevant information for the set of unfilled slots.

3. The method of claim 2, all the limitations of which are incorporated herein by reference, wherein:
the constructing step is dependent upon pre-defined atomic grammars each associated with at least one of the selected subset of slots and upon pre-defined grammar composition rules;
said generated prompt forms, together with the composite grammar, at least part of the current dialog cycle;
and wherein the method comprises using the at least one computer to perform a further step of:
filling one or more of the set of unfilled slots with said relevant information.

4. The method of claim 3, all the limitations of which are incorporated herein by reference, wherein the comparing step comprises matching said atomic grammars in the composite grammar against the user response.

5. The method of claim 2, all the limitations of which are incorporated herein by reference, further comprising using the at least one computer to perform the steps of:
determining if execution flow of the current dialog cycle is complete;
and if said flow is not complete, performing one of the steps of:
disambiguating the user response;
confirming the user response; and
repeating the selecting, constructing, generating, receiving, comparing and determining steps for a subsequent subset of slots.

6. The method of claim 2, all the limitations of which are incorporated herein by reference, wherein the selecting step is dependent upon at least one of a previous user response, a history of dialog-interaction which includes previous prompts and responses, a desired dialog flow, as yet unfilled slots in the set of information slots, and the selected subset of slots.

7. The method of claim 2, all the limitations of which are incorporated herein by reference, wherein the constructing step is dependent upon at least one of:
a history of dialog-interaction which includes previous prompts and responses; and
a desired dialog flow.

8. The method of claim 2, all the limitations of which are incorporated herein by reference, wherein the generating step is dependent upon at least one of:
pre-defined slot information;
prompt generation rules; and
a desired dialog flow.

9. The method of claim 2, all the limitations of which are incorporated herein by reference, wherein the selecting of the subset of slots is dependent upon a state of a dialog with said user and pre-defined dialog flow information.

10. The method according to claim 2, all the limitations of which are incorporated herein by reference, further comprising at least one of the steps of:
acquiring slot information from a user input;
disambiguating acquired slot information; and
confirming acquired slot information.

11. The method of claim 10, all the limitations of which are incorporated herein by reference, further comprising repeating the steps of:
constructing the composite grammar;
generating the prompt;
receiving the user response;
acquiring the slot information;
disambiguating the acquired slot information; and
confirming the acquired slot information, until all the unfilled slots in the set of information slots have been filled.

12. The method of claim 11, all the limitations of which are incorporated herein by reference, wherein the user can specify the execution sequence of different phases of the dialog using a dialog flow strategy.

13. The method of claim 12, all the limitations of which are incorporated herein by reference, wherein the dialog flow strategy comprises:
definition of a sequence of execution of different steps of user-interaction comprising information collection for slots, disambiguation and confirmation;
definition of slots that form part of each user interaction;
definition of a method to be used for the particular user-interaction; and
definition of a termination condition for dialog flow execution.

14. The method of claim 2, all the limitations of which are incorporated herein by reference, wherein the slots to be filled are determined based on a current state of the dialog slots that have been filled or their disambiguation state or their confirmation state;
the slot information; and
the dialog flow strategy.

15. A method of generating a mixed-initiative dialog to obtain information for a set of information slots in a voice dialog system capable of receiving voice inputs from a user via at least one audio input interface and providing voice prompts to the user via at least audio output interface, the method comprising computer implemented steps performed by the voice dialog system, the method comprising:
using at least one computer to perform steps comprising:
selecting a subset of slots from the set of information slots, dependent upon a set of unfilled slots for which information is to be obtained in a current dialog cycle;
constructing a composite grammar dependent upon the selected subset of slots;
defining rules for prompt generation;
using the rules, identifying a prompt segment associated with each slot in the selected subset of slots; and
combining the prompt segments, in an order specified by the rules, to generate the prompt for the selected subset of slots;
receiving a user response to the prompt via the at least one audio interface;

comparing the response to the composite grammar; and determining, dependent upon the comparing step, if the response provides relevant information for the set of unfilled slots.

16. The method of claim 15, all the limitations of which are incorporated herein by reference, wherein said generating step is dependent upon at least one of pre-defined slot information, and dialog flow information.

17. A system for generating a mixed-initiative dialog to obtain information for a set of information slots, the apparatus comprising:

a processor operable to:

select a subset of slots from the set of information slots, dependent upon a set of unfilled slots for which information is to be obtained in a current dialog cycle;

construct a composite grammar dependent upon the selected subset of slots, comprising:

selecting from specified grammar composition rules those rules that apply to the selected subset of slots;

forming a slot grammar for each slot in the selected subset of slots using at least one corresponding rule in the selected grammar composition rules; and combining the slot grammars using the selected grammar composition rules to produce the composite grammar, said composite grammar being applicable to permutations of the selected subset of slots;

generate prompt dependent upon the selected subset of slots;

compare a user response to the composite grammar; and determine, dependent upon the comparing step, if the response provides relevant information for the set of unfilled slots;

an output device adapted to present the prompt; and an input device for receiving the user response to the prompt.

18. The system of claim 17, all the limitations of which are incorporated herein by reference, wherein the processor is further operable, if the user response is determined to provide relevant information, to fill at least one of the unfilled slots with at least a part of the user response.

19. The system of claim 17, all the limitations of which are incorporated herein by reference, wherein the processor is further operable to determine if the execution flow of the current dialog cycle is complete;

and if said flow is not complete, to perform one of the steps of disambiguating the user response, confirming the user response, and repeating the selecting, constructing, generating, receiving, comparing and determining steps for a subsequent subset of slots.

20. The system of claim 17, all the limitations of which are incorporated herein by reference, wherein the processor is further operable to repeat the steps of constructing the composite grammar, presenting the prompt, receiving the user response, comparing the response to the composite grammar, and determining, dependent upon the comparing step, if the response provides relevant information for the selected subset of slots.

21. A computer program product comprising a non-transitory computer readable storage medium having a computer readable program, wherein the computer readable program when executed on a computer causes the computer to:

select a subset of slots from the set of information slots, said selected subset being dependent upon unfilled slots in the set for which information is to be obtained in a current dialog cycle;

construct a composite grammar dependent upon the selected subset of slots, comprising:

selecting from specified grammar composition rules those rules that apply to the selected subset of slots;

forming a slot grammar for each slot in the selected subset of slots using at least one corresponding rule in the selected grammar composition rules; and combining the slot grammars using the selected grammar composition rules to produce the composite grammar, said composite grammar being applicable to permutations of the selected subset of slots;

generate a prompt dependent upon the selected subset of slots;

receive a user response to the prompt;

compare the response to the composite grammar; and determine, dependent upon the comparing step, if the response provides relevant information for the unfilled slots.

* * * * *